United States Patent [19]

Joehlin et al.

[11] Patent Number: 4,807,144

[45] Date of Patent: Feb. 21, 1989

[54] TEMPERATURE CONTROL SYSTEM FOR GLASS SHEET FURNACE

[75] Inventors: Stanley W. Joehlin, Curtice; Jeffrey N. Klopping, Toledo, both of Ohio

[73] Assignee: Glasstech International L.P., Dover, Del.

[21] Appl. No.: 936,804

[22] Filed: Dec. 2, 1986

[51] Int. Cl.$^4$ .................. G06F 15/46; C03B 29/04
[52] U.S. Cl. ..................... 364/473; 364/476; 364/477; 65/162
[58] Field of Search ............. 364/477, 473, 476, 557; 65/29, 158, 162

[56] References Cited

U.S. PATENT DOCUMENTS

| | | | |
|---|---|---|---|
| 3,257,188 | 6/1966 | Morgan et al. | 65/162 |
| 3,479,172 | 11/1969 | McCown et al. | 65/158 |
| 3,744,985 | 7/1973 | Peternel | 65/162 |
| 4,043,780 | 8/1977 | Bricker et al. | 65/29 |
| 4,201,563 | 5/1980 | Bricker | 65/162 |
| 4,223,385 | 9/1980 | Miller et al. | 364/477 |
| 4,276,603 | 6/1981 | Beck et al. | 364/477 |
| 4,463,437 | 7/1984 | Schenck et al. | 364/477 |
| 4,601,743 | 7/1986 | Canfield | 65/162 |
| 4,617,638 | 10/1986 | Krause et al. | 364/477 |
| 4,737,917 | 4/1988 | Perron | 364/477 |

Primary Examiner—John R. Lastova
Attorney, Agent, or Firm—Brooks & Kushman

[57] ABSTRACT

A temperature monitoring and control system for a glass sheet processing system includes a temperature sensor mounted at a preselected location in the system, a display, and a computer connected to the temperture sensor for periodically receiving a series of signals corresponding to temperature values transmitted by the sensor. The computer includes memory for storing selected values received from the temperature sensor and memory for storing one or more preselected threshold values. The computer also includes control logic for comparing the temperature values with one or more of the preselected threshold values, selecting and storing a set of those temperature values which satisfy a predetermined criteria, and displaying the set of temperature values as a profile taken along the length of the glass sheet in the direction of conveyance of the sheet through a glass processing system. The system preferably includes a data input device and provides the operator with the ability to program one or more of the threshold values. The system may also include an output to the power source of the furnace in the glass processing system for varying the power to the furnace, and control logic for comparing the stored temperature values with one or more preselected threshold values and transmitting a signal to vary the power supplied to the furnace as a function of the results of the comparison of the stored values with the preselected threshold values.

19 Claims, 4 Drawing Sheets

TEMPERATURE CONTROL SYSTEM FOR GLASS SHEET FURNACE

TECHNICAL FIELD

The present invention relates generally to glass sheet processing systems and, in particular to an automatic temperature monitoring and control system for use with glass sheet processing systems.

BACKGROUND OF THE INVENTION

Glass sheet processing systems for bending and/or tempering architectural glass or automotive glass include a furnace defining a heating chamber through which glass sheets are conveyed for heating and preparation for bending and/or tempering. One example of these systems is the horizontal oscillating glass tempering system disclosed by U.S. Pat. No. 3,994,711.

These systems typically include a roller conveyor for conveying the glass sheets, first from a supply table into the heating chamber, through the heating chamber, into and through a quench unit, and out of the quench and onto a take-out table from which the processed glass is removed.

The heating chambers in these systems typically include a plurality of independently controlled heating zones.

These systems also typically include a central control system capable of simultaneously monitoring various conditions throughout the system, including to the temperature within the furnace and the position of the glass sheets during processing. The central control system typically includes an operator interface or console which may be in the form of a teletype unit for inputting various data, such as desired temperature set points, into the central control system master computer.

One factor that is particularly critical in the efficient operation of these systems is the regulation of the heat within the furnace to insure the glass sheets are evenly heated to the desired temperature.

During installation and repair of the system, one or more temperature sensors, in the form of optical pyrometers are inserted at preselected locations in the system and connected to an analog strip chart recorder in order to create a strip chart. The strip chart is a graphic representation of the constant fluctuation in temperature on the surface of the glass sheets as they pass the preselected location.

These strip charts may be analyzed by trained personnel to provide information about the temperature fluctuation along the surface of the moving glass sheet and, therefore, the efficiency of the heating chamber. However, the graphic analog information disclosed by the strip charts is voluminous and is not translated into data recognizable to the operator—such as actual temperature values, and is therefore of limited use as a dynamic monitoring or feedback tool for the operator.

Also, the continuous stream of signals recorded by the strip chart recorder includes signals corresponding to temperatures taken at points between glass sheets. In addition, the continuous nature of the output does not allow the operator to isolate temperature profiles for individual glass sheets of varying sizes.

It is one object of the present invention to provide an automatic temperature monitoring and control system for use in connection with a glass sheet processing system which provides nearly instantaneous information to the operator in the form of a temperature profile of the surface temperatures along the direction of conveyance of a glass sheet conveyed through the system.

It is also an object of the present invention to provide a automatic temperature monitoring and control system for use in connection with a glass sheet processing system which provides nearly instantaneous information to the operator in the form of a temperature profile of the surface temperatures along the direction of conveyance of glass sheets for a single load of glass sheets conveyed through the system.

It is also an object of the present invention to provide an automatic temperature monitoring and control system which allows the operator to program in selected values for one or more variables utilized by the system. In particular, it is an object of the present invention to provide a system which allows the operator to vary the values of one or more variables in order to insure that each of the temperature profiles displayed by the system represents a profile along the length of a glass sheet or load of glass sheets for glass sheets and loads of varying length.

It is also an object of the present invention to provide an automatic temperature monitoring and control system which provides nearly instantaneous statistical information in the form of average, maximum, or minimum temperatures or the like, for each load and/or for each sheet in a load of glass sheets being conveyed through the glass processing system.

It is also an object of the present invention to provide an automatic temperature monitoring and control system which provides nearly instantaneous statistical information for each glass sheet being conveyed through the glass processing system along with a display of like statistical information for a previous number of glass sheets.

It is also an object of the present invention to provide an automatic temperature monitoring and control system which provides nearly instantaneous statistical information for each load of glass sheets being conveyed through the glass processing system along with a display of like statistical information for a number of previous loads of glass sheets.

It is a further object of the present invention to provide an automatic temperature monitoring and control system which monitors the temperature on the surface of glass for the entire length of a glass sheet traveling past a selected point in the system, analyses the temperatures, and automatically adjusts the power to one or more of the heating zones about the length of the heating chamber as a function of the analyzed temperature data.

SUMMARY OF THE INVENTION

According to the present invention, an automatic temperature monitoring and control system is provided for a glass sheet processing system including a furnace and a conveyor for transporting glass sheets within the furnace. The automatic temperature monitoring and control system includes a temperature sensor mounted at a preselected location in the system, a display, and a computer connected to the temperature sensor for periodically receiving a series of signals corresponding to temperature values transmitted by the sensor. The computer also includes memory for storing selected values received from the temperature sensor, memory for storing one or more preselected threshold values, and control logic for comparing the temperature values with one or more of the preselected threshold values, selecting and storing a set of those temperature values which satisfy a predetermined criteria, and displaying the set of temperature values as a profile of the temperature taken along the length of a glass sheet.

In the preferred embodiment, one of the preselected threshold values is a Threshold Temperature and the predetermined criteria includes comparing each of the stored signals to the Threshold Temperature to insure that the set stored in memory contains only those temperatures following the first temperature reading above the Threshold Temperature.

The system also preferably provides the operator with the ability to define ("program") various threshold values, such as the Threshold Temperature, the number of readings in a particular set, an initial time delay and a second time delay between each of the stored readings. Thus, for example, the operator can vary the set size and/or, time delay between readings according to the size of the particular glass sheets to insure that the readings from a set represent a profile taken about the entire length of a glass sheet in the direction of conveyance of the sheet in a particular load.

The system of the present invention also preferably includes control logic for computing one or more statistical values, such as averages, maximum values, minimum values, standard deviations, etc., for a set of all of the temperature values satisfying the predetermined criteria. One or more of the computed statistical values may be displayed by the system for the operator's immediate use in the operation of the system.

The temperature sensor is preferably placed just outside the furnace at the exit opening of the conveyor and oriented to sense the temperature on the glass sheets as they exit the furnace on the conveyor.

In one embodiment of the present invention, the computer includes an output to the power source of the furnace for varying the power to the furnace, and control logic for comparing the stored temperature values with one or more preselected threshold values and transmitting a signal to vary the power supplied to the furnace as a function of the results of the comparison of the stored values with the preselected threshold values.

In contrast to prior systems, the information selected by the operator as important to the control of the furnace is processed and displayed nearly instantaneously, so that the operator receives immediate feedback and can make immediate adjustments such as, for example, to vary the heat within particular zones in the furnace to achieve even heating of the glass.

Also, the system is capable of generating a display of selected information from previous loads along with information from the current load. For example, the average temperature for the present load of glass sheets may be displayed along with the averages for each of the last five loads, giving the operator a relatively long term profile of the glass temperature.

The objects, features, and advantages of the present invention are readily apparent from the following detailed description of the best for carrying out the invention when considered in connection with the accompanying drawings.

DETAILED DESCRIPTION OF THE BEST MODE

Figure 1:
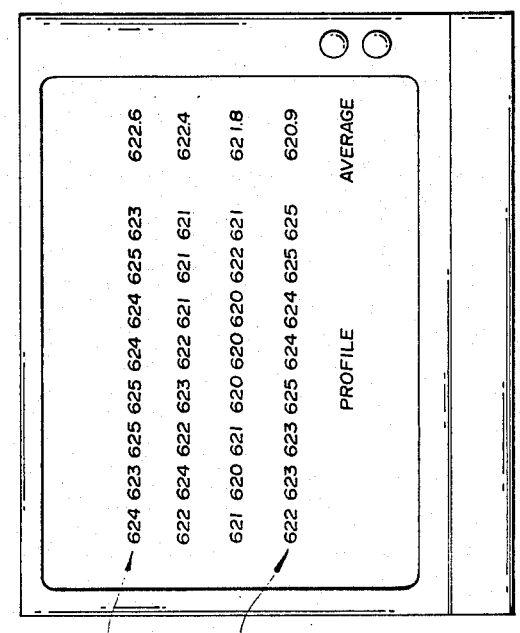
FIG. 1 is a block diagram of a glass sheet processing furnace employing one embodiment of the system of the present invention.

Referring to FIG. 1, the temperature monitoring and control system of the present invention generally indicated by reference numeral 10 is typically utilized with a glass processing system 20. The glass processing system 20 typically includes a furnace 22 defining a heating chamber 24 into which a load of one or more glass sheets 26 is transported along a longitudinal path within the furnace 22 for the purpose of heating the glass sheets to a preselected desired temperature. The glass sheets are typically transported through the furnace 22 by a roller conveyor 28 with a plurality of elongated rollers extending through the heating chamber 24 in the furnace 22 and outwardly through an exit opening 30 at the end of the furnace 22. The glass sheets 26 are then transported on the conveyor 28 into a quench and cooling unit 34 for tempering and/or further other processing of the glass sheets 26.

A plurality of electrically powered resistive heating elements (not shown) may be employed for providing radiant heat within the heating chamber 24 of the furnace 22. The resistive heating elements may be grouped into a plurality of heating zones 36-42 with each heating zone extending, for example, across the width of, and along a portion of the length of the heating chamber 24. The electrical power to the resistive heating elements in each of the heating zones 36-42 may be independently controlled so as to allow the operator to vary the amount of radiant heat emitted by each of the particular zones.

It should be noted that a glass processing system employing the temperature monitoring and control system 10 of the present invention is disclosed in greater detail in U.S. Pat. No. 3,994,711, which is hereby incorporated herein. It should also be noted that, although the temperature monitoring and control system of the present invention is currently utilized in a horizontal oscillating glass processing system, the system 10 of the present invention may be similarly employed with horizontal continuous glass processing systems or other like glass sheet processing systems having furnaces with heating chambers employing multiple heating zones. Examples of other glass sheet processing systems are those disclosed in U.S Pat. Nos. 3,934,970 and 4,575,390.

The temperature monitoring and control system 10 of the present invention includes a temperature sensor 44 mounted at a fixed location in the glass processing system 20 and oriented to monitor the temperature at a preselected location along the conveyor 28. In the preferred embodiment, the temperature sensor 44 is mounted outside the furnace 22 adjacent the exit opening 30. Mounting the temperature sensor 44 outside the furnace 22 results in a greater differential between the relatively higher temperature of the glass, on the order of 620° Fahrenheit, and the significant lower temperature readings obtained at points between glass sheets thereby making the process of identification of glass surface temperatures and the number of glass sheets in a load simpler and more reliable than if the temperature sensor were located within the furnace and was discriminating between relatively similar furnace temperatures and the glass surface temperatures.

The temperature sensor 44 is typically connected to a computer 46 having memory 48 for storing certain of the values received from the temperature sensor 34, memory 50 for storing one or more preselected threshold values and control logic 52 for comparing the temperature values received from the temperature sensor 44 with one or more of the preselected threshold values stored in memory 50 to determine whether the values satisfy a predetermined criteria, storing the set of temperature values satisfying the predetermined criteria in memory 48 and displaying the set of temperature values on a display 54 connected to the computer 46.

It should be noted that the computer 46 is preferably a microprocessor, such as the Motorola 6809 with sufficient Random Access Memory (RAM) for each of memory banks 48 and 50 and with sufficient RAM for software microcode which is suitably programmed to perform the control logic function 52 for the system 10.

In the preferred embodiment, the hardware portion of the system is configured as a Mikul CPU Board, No. 6809-4, and a Mikul Universal Memory Board No. 6018, each manufactured by TL Industries of Northwood, Ohio. However, it will be appreciated by those skilled in the art that any suitably programmed computer having sufficient memory may be utilized to accommodate the system of the present invention such as, for example, microprocessor or other computer otherwise utilized in connection with the operation of the glass processing system 22.

Display means 54, in the form of a conventional video monitor and/or printer are employed in the system of the present invention for displaying the set of temperature values, representing a profile of the temperature of the surface along the length of the glass sheets, for the operator's immediate review.

A data input device 57, preferably in the form of a teletype unit or keyboard, is provided for inputting various data, such as programmable threshold values.

In the preferred embodiment, the temperature sensor is an optical pyrometer, such as the Ircon model no. 7-98C10-0-0-0-22-0/000 produced by Ircon, Inc. of Skokie Ill. The pyrometer is connected to an analog-to-digital converter, such as the Acromag Series 6810 Analog Board and Acromag Hi-Level Terminal Panel Series 6920, each manufactured by Acromag, Inc. of Wixom, Mich., for converting the analog signals transmitted by the pyrometer to digital signals useful to the computer 46.

The memory 50 for storing one or more preselected threshold values is preferably electrically alterable read only memory (EAROM).

As previously described, the control logic 52 is preferably software in the form of microcode. However, it will be appreciated by those skilled in the art that the microcode may be burned into Read Only Memory (ROM) or otherwise implemented in hardware form capable of performing the control functions defined herein without the departing from the spirit of the present invention.

Figure 4:
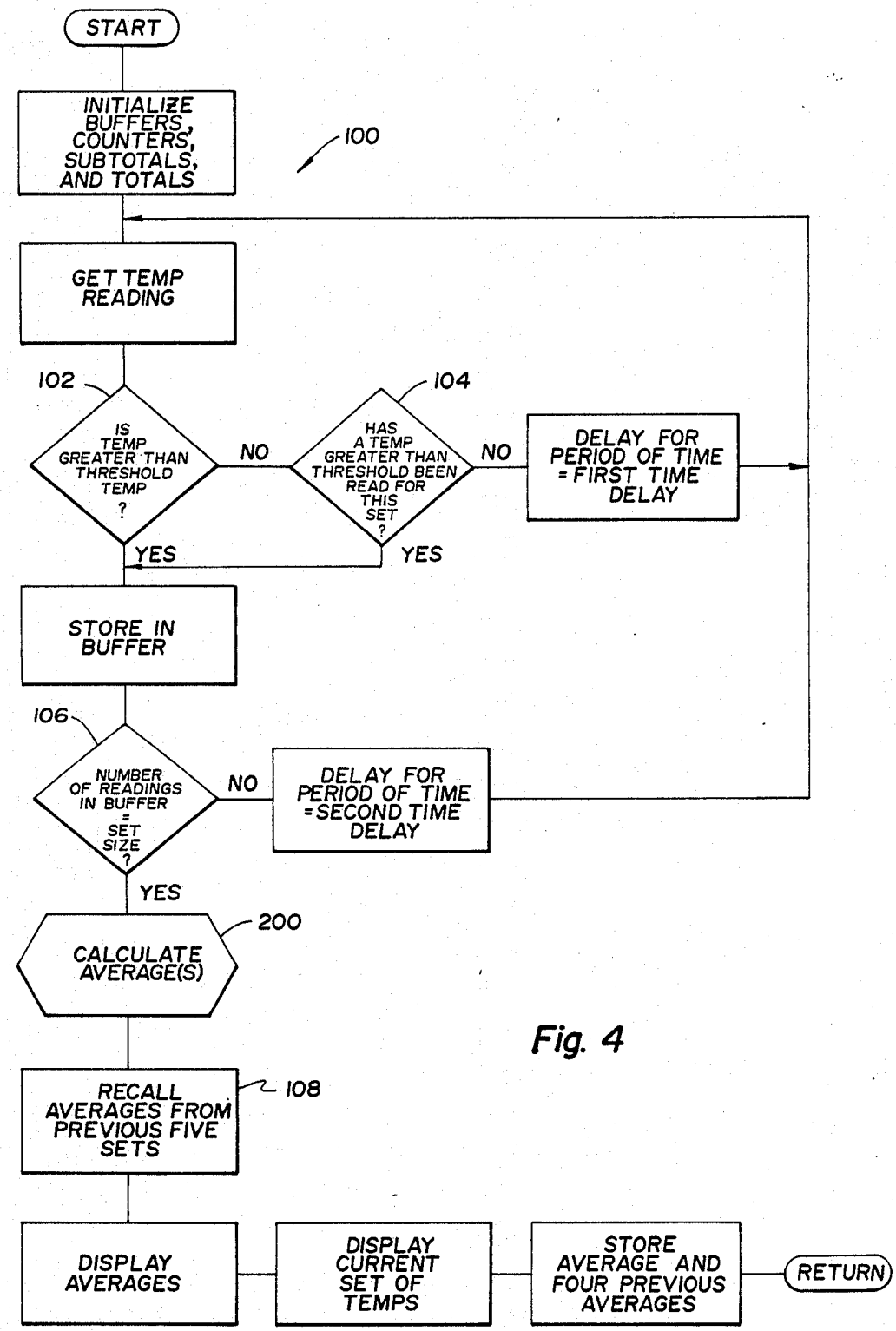
FIG. 4 is flow chart depicting the control logic employed in the embodiment of the system of the present invention illustrated in FIG. 1.

Referring to FIG. 4, the control logic of the preferred embodiment of the present invention performs the functions illustrated in this flow chart. First, the system must initialize any buffers and/or any memory location which may be utilized during the operation of the system such as four byte storage locations for the current temperature reading, a first subtotal of temperature readings for a set, a second subtotal of temperature readings for a set, a total of all temperature readings for a set, an average of each of the first and second temperature subtotals and the temperature total for a set, various counters, flags, and a buffer sufficient in size to accommodate at least the maximum number of temperatures for a particular set. In the preferred embodiment, the buffer accommodates up to 32 temperatures, with 4 bytes allocated for storage of each temperature value. Storage locations for each of the preselected threshold values, or an address pointer to the location of these values in the EAROM, must also be initialized.

In the preferred embodiment, the following threshold values are programmable and are stored in EAROM:

Threshold Temperature—the temperature (usually about 575° Fahrenheit) for which it is assumed that any temperature above the threshold is a valid glass sheet surface temperature and any temperature below the threshold is invalid, such as the temperature reading of a point between the glass sheets moving along the conveyor.

First Time Delay—a time delay typically about 18 microseconds between initial readings. Assuming that the First Time Delay begins running at the edge of the glass sheet, the extent of this time delay, at the current speed of the system's conveyor, should result in the next temperature reading being taken a sufficient distance in from the edge of the glass sheet that the reading is likely to be reliable.

Second Time Delay—this variable (typically about 18 microseconds) specifies the delay between temperature readings taken after the first temperature reading above the Threshold Temperature is recorded.

Set Size Value—this variable (pre-set to 32) represents the number of temperature readings in a set.

It should be noted that the value of these variables will vary according to different applications and sizes of glass sheets. For example, the Second Time Delay and/or Set Size Value will be varied to insure that the frequency and number respectively, of temperature readings taken, will yield a profile representative of the surface temperature along the entire length of a particular glass sheet.

After initialization, the system obtains a digital value corresponding to a temperature reading from the sensor 44. The system then determines, at 102, whether the temperature reading is greater than the Threshold Temperature. If the temperature reading is not greater than the Threshold Temperature the system then determines, at 104, whether a temperature greater than the Threshold Temperature has been read for this set. If not, the system delays for a period of time equal to the First Time Delay, then gets another temperature reading from the sensor 44.

The system continues in this loop until the first reading greater than the Threshold Temperature is obtained. At this point, that temperature reading is stored in a buffer location and the system checks, at 106, to determine if the number of temperature readings in the buffer location is equal to the Set Size Value. If an entire set has not yet been stored in the buffer, the system delays for a period of time equal to the Second Time Delay before getting the next temperature reading.

When the number of temperature readings stored in the buffer is equal to the Set Size Value, the system calculates the average temperature for that set of temperature values. The average temperature calculation routine employed in the preferred embodiment will be discussed in greater detail in connection with a discussion of FIG. 5. However, it should be noted here that, in the preferred embodiment, the system calculates one average for the set if it has been determined that the set contains a temperature profile for a single glass sheet or more than two glass sheets. If the average calculation routine determines that the temperature set represents the temperature profiles for two glass sheets, it will calculate two average temperatures, one for each of the glass sheets. This particular strategy is employed because, at an average Set Size of 32 readings taken at an average of 18 microseconds apart, a separate average for more than two glass sheets would be relatively less useful since those averages would reflect samplings of such a small size as to not be truly representative of a useful temperature profile.

However, programming of the Set Size Value and/or Second Time Delay may be altered to yield useful profile sets for larger numbers or relatively smaller lengths of glass sheets. Similarly, the averaging program may be altered to calculate and store more than two average temperatures for a particular set. Conversely, the frequency of temperature readings in a particular set can be increased to insure that each set represents only one glass sheet of a particular known length, so that a single average can be elicited from each set of values.

It will be appreciated by those skilled in the art that other statistical values, such as the maximum temperature, minimum temperature, or standard deviation for a particular set of temperatures may be calculated by implementing a suitable program for these purposes.

Referring again to FIG. 4, after the average(s) are calculated for the current set of temperature readings, the system then recalls the averages from the previous five sets, at 108. The current average(s) are then displayed with the previous five averages to give the operator a general profile over an extended time period, of the surface temperature of the glass sheets. The system then also displays the current set of temperature readings for immediate review by the operator and stores the average and four of the previously stored averages for recall during the next cycle.

It should be noted that, in the preferred embodiment, the profile of average temperatures is displayed on a video monitor, while the profile of the current set of temperature readings is simultaneously printed on a line printer or teletype machine. The line printer is used to display the current temperature profile because the set of temperatures, typically numbering 32 readings, tends to clutter the relatively small screen of the conventional monitor. However, the actual format and mode of display may be altered without departing from the spirit of the present invention.

Figure 3:
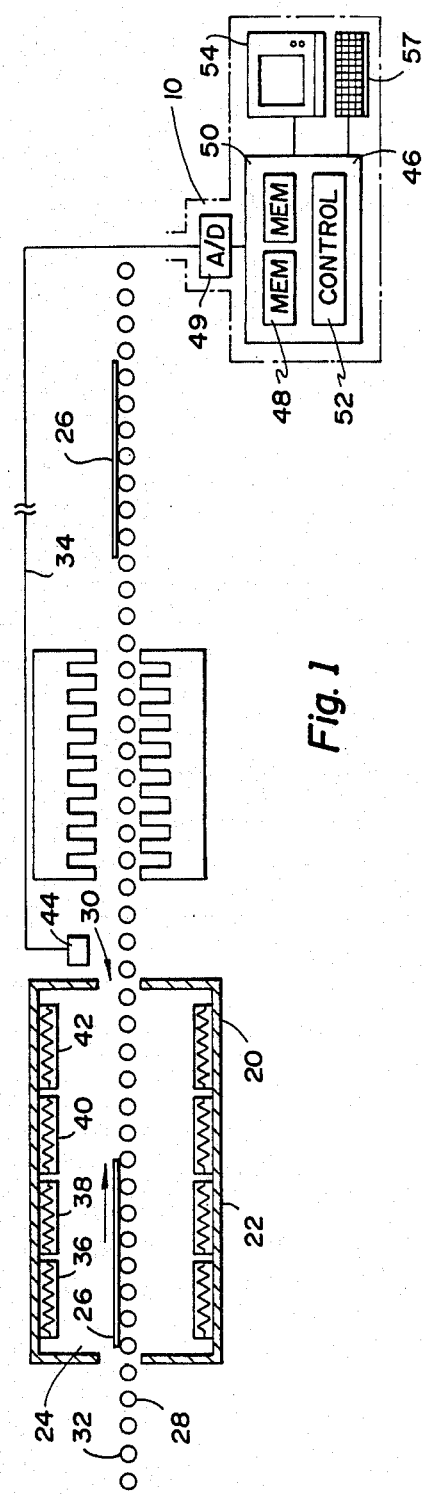
FIG. 3 is an illustration of a typical temperature profile and average temperature report generated by the system of the present invention.

FIG. 3 illustrates a typical temperature profile for a set of temperature readings and current and previous average display created by the system of the present invention. It will be appreciated by those skilled in the art that the particular profile illustrated in the FIGURE identifies that the glass surface temperatures for this particular glass sheet are relatively higher at each of the ends of the sheet, represented by groups 110 and 112 of readings at the beginning and end of the profile. If this profile were taken from a horizontal oscillating processing system having, for example, four independently controlled heating zones 36–42, such as shown in FIG. 1, the operator might lower the temperature setting in each of the end zones 36 and 42 since the relatively higher temperature portions of the glass sheet —the edges of the glass sheet—spend relatively more time in the end zones 36 and 42 during oscillation of the sheet within the furnace, while the relatively lower temperature middle portion of the glass sheet spends relatively more time in the middle zones 38 and 40 on the furnace.

Thus, the operator is able to immediately review a temperature profile for the last glass sheet or load of glass sheets processed by the system and adjust the power input to the heating zones 36–42 of the system 20 accordingly.

Similarly, a review of the average profile over time may indicate that the average temperature of the surface of the glass sheets processed by the system is gradually increasing, indicating the need for a reduction in the power supply to the furnace.

Figure 5:
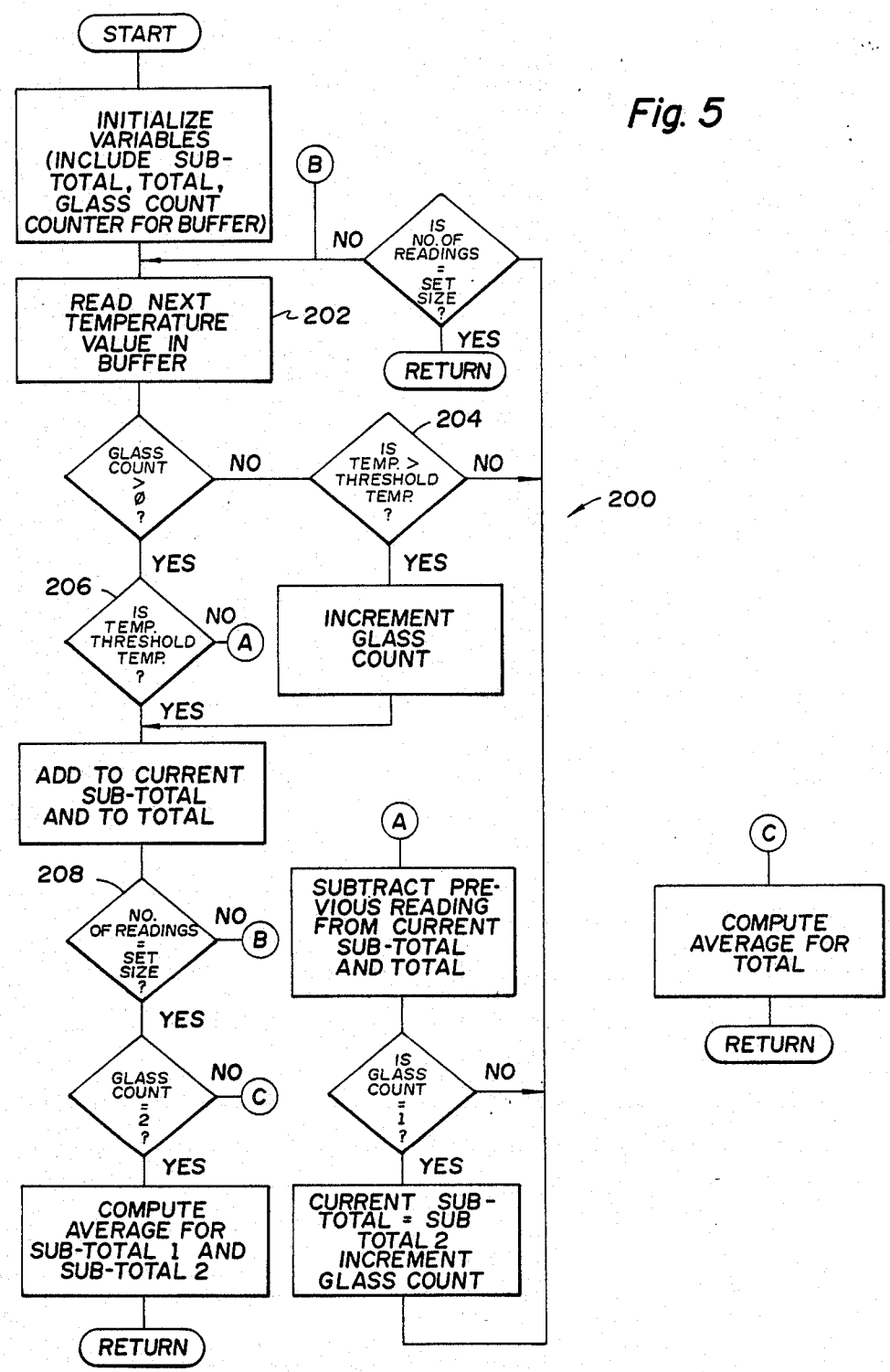
FIG. 5 is a flow chart depicting the control logic employed to calculate the average temperature of temperature profile sets.

FIG. 5 illustrates a flow chart for the average computation routine 200 employed by the preferred embodiment of the present invention. This routine begins by initialization of any variable utilized by the routine, such as first subtotal, second subtotal, total, glass count, etc.

At 202, the first temperature reading from the current set is read from the buffer. The system then determines whether the glass count is greater than zero. If the glass count is equal to zero, the system then determines, at 204, whether the temperature reading is greater than the Threshold Temperature. If the reading is not greater than the Threshold Temperature the next temperature is read from the set and the process is continued until, at 204, a temperature greater than the Threshold Temperature is first read. At this point, the glass count is incremented (to a value of one) and the temperature value is added to the current subtotal (which is initially Subtotal) and to the total.

The system then checks to see if the number of readings is equal to the Set Size. If not the system proceeds, at B, to read the next temperature. At this point, the glass count is now equal to at least 1 and, if the temperature readings are greater than the Threshold Temperature, the readings are continuously added to the current subtotal and to the totals.

Returning to 206, if the current temperature reading is not greater than the Threshold Temperature, the system presumes that this reading was taken at a point between two glass sheets. Proceeding to A, the system subtracts the previous reading from the current subtotal and total since the previous reading may have been taken too the near the edge of the previous glass sheet to be an accurate indication of the surface temperature of the glass sheet. If the glass count is equal to 1 (that is, the previous glass sheet was the first glass sheet) the glass count is incremented and Subtotal2 becomes the current subtotal for the remaining readings. If the glass count is not equal to 1 (that is, it is greater than or equal to 2) the system continues to add the remaining temperature readings to Subtotal2.

The system continues to retrieve temperature readings from the set stored in the buffer until, at 208, it is determined that the number of readings is equal to the Set Size Value. At this point, the system computes the average. If the glass count is equal to 2 (that is, this set contains the temperature profiles for two glass sheets) the system computes the average for each of the two glass sheets, contained in Subtotal1 and Subtotal2 respectively. If the glass count is 1 or is greater than 2, the system computes the average for the total of the temperature readings in the set.

Again, it should be noted that, in the preferred embodiment, the system computes a single average for one set unless it determines that the set of temperatures represent profiles for two glass sheets. In the event that the set of temperatures is determined to represent profiles for more than two glass sheets, a single average for the total load is computed because division of the relatively small set, typically 32 readings, into more than two groups may yield an unreliable statistical sampling. However, the averaging routine can be modified to count, and compute averages for, any number of glass sheets in a load of glass sheets represented by a particular set of temperature readings. It should be noted that the frequency of readings can be increased (that is, the Second Time Delay can be decreased) and/or the size of the set can be adjusted to insure that a sufficient number of readings for each of a number of relatively smaller glass sheets in a load can yield reliable profiles and corresponding averages. Conversely, the size of the sets and frequency of the readings can be adjusted to insure that each set contains a profile for a single glass sheet, particularly in the case for relatively larger glass sheets.

Figure 2:
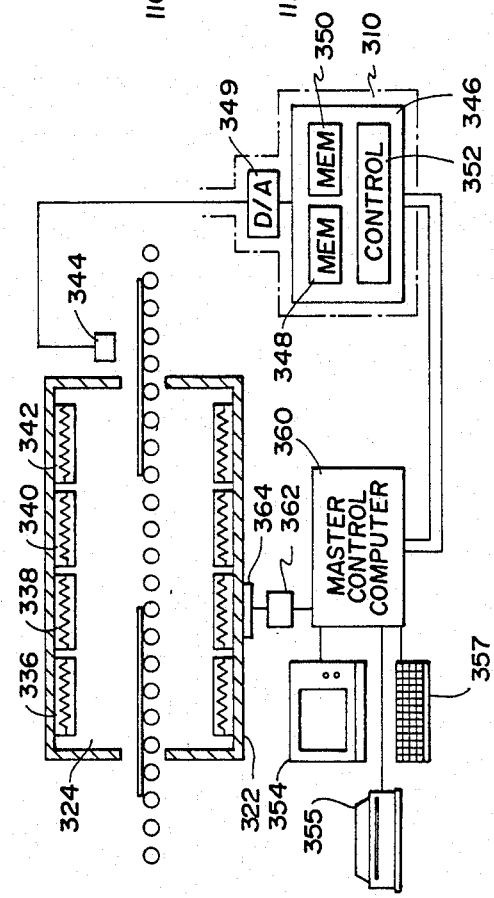
FIG. 2 is a block diagram of a glass sheet processing furnace employing another embodiment of the system of the present invention.

Referring to FIG. 2, another embodiment of the system of the present invention utilizes the temperature monitoring system to dynamically control the power issued to one or more of the heating zones 336-342 in the heating chamber 324 of the furnace 322. As with the previously described embodiment, this second embodiment includes a temperature sensor 344, preferably in the form of an optical pyrometer, operably connected to a computer 346 including memory 348 for storing certain of the digital values corresponding to temperatures sensed by the pyrometer, memory 350 for storing certain preselected threshold values used by the control and monitoring system, and control logic 352 including logic for reviewing each of the temperature readings in a set corresponding to a single glass sheet or a single load of glass sheets, comparing the set of readings to one or more the threshold values according to a predetermined criteria, and transmitting a signal to vary the power to one or more of the zones 336-342 within the heating chamber 324 of the furnace 322.

The system also employs display means, preferably in the form of a video monitor and/or printer, an output to the variable power source used to power the heating elements in the various heating zones 336-342 within the furnace 322 and a data input device 357.

As shown in FIG. 2, the system of the present invention may reside in a separate board including a microprocessor, and the RAM necessary for the operation of the system, which in turn is connected to a second "Master" control computer 360 which is responsible for the general control and monitoring of the glass sheet processing system functions. When configured in this manner, the display means 354, 355 and data input means 357 may be connected directly to the Master control computer 360 and the system of the present invention as a "slave" computer may be operably connected to each of the displays 354, 355 through an output to the Master control computer 360.

This embodiment of the system also preferably includes an analog-to-digital converter 349, for converting the analog signals transmitted by the pyrometer to digital values for receipt and storage in the systems computer 346 and a digital-to-analog converter 362 for conversion of digital signals transmitted by the control logic 346 of the system, or by the Master computer control 360 control system in response to an appropriate signal from the system's control logic 352 to vary the power from the power source 364 to one or more of the heat zones 336-342 in the furnace 322.

It should be noted that both of the embodiments described above and illustrated in FIGS. 1 and 2 may be configured as slave systems operably connected to a Master control computer (as shown in FIG. 2) or as an integral part of the Master control computer itself without departing from the spirit of the present invention.

Figure 6:
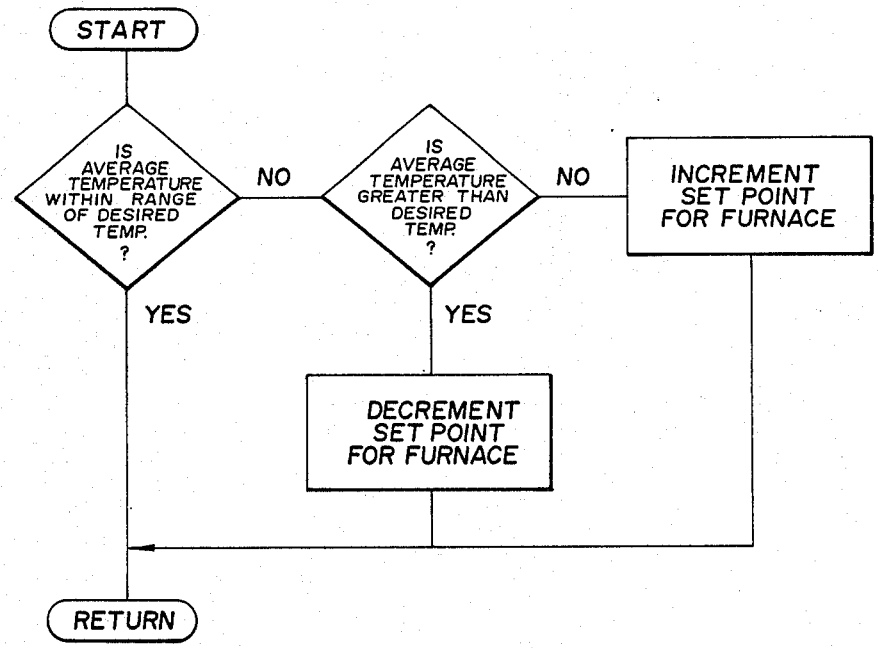
FIG. 6 is a flow chart depicting the control logic employed in a closed loop embodiment of the system of the present invention.

FIG. 6 illustrates a flow chart of a simple criteria which may be used by the system of this second embodiment to automatically adjust the power to one or more zones 336-342 in the furnace 322 to automatically adjust the heat along the length of the heating chamber 324 in direct response to temperature readings received and analyzed by the system 310. This criteria assumes that a range of desired temperatures has been preselected by the operator, such as, for example, by programming predefined upper and lower temperature range values. If the average temperature is not within the desired range, the system can increment or decrement the current temperature set point for the furnace accordingly.

For example, if the temperature set point is 675° F. and the average temperature for a preselected number of sets, representing the average surface temperature of the glass sheets for those loads, is greater than the upper limit of the desired range, the system could automatically decrement the set point to, for example, 673° F. resulting in an automatic lowering of the temperature within the furnace 322.

Similarly, the automatic control logic could be modified to compare a portion, such as the beginning and ending segments, of a temperature profile to determine whether, for example, the edges of the glass sheet represented by that profile are significantly hotter or cooler than the middle portion of the glass sheet, and, alter the set point for particular zones, for example, zones 336 and 342, in order to automatically adjust the temperature within the furnace 322 to equalize the surface temperature along the length of the glass sheet.

It will be appreciated by those skilled in the art that more complex criteria can be developed for particular sizes of glass sheets and particular furnace configurations in order to successfully vary the temperature within the furnace, or within selected zones in the furnace as a result of temperature profiles generated for glass sheets conveyed through the system.

It should also be noted that the control logic 352 of the present invention may effect a change in the power supplied by the power source 364 to the furnace 322 by merely altering the digital values corresponding to Temperature Set Point values, maintained in memory 350 in the system 310 or in the memory of the Master control computer 360. Thus, an existing control system can be modified and/or enhanced by the temperature monitoring and control system of the present invention.

While two embodiments have been described, those skilled in the art will recognize various alternative that can be used in carrying out the invention as described by the following claims.

What is claimed is:

1. In a glass processing system including a furnace and a conveyor for transporting glass sheets along a longitudinal path within the furnace, an automatic temperature monitoring and control system comprising:
a temperature sensor mounted at a preselected location within the glass processing system for determining the temperature on the surface of glass sheets moving along the conveyor past the preselected location;
an input device;
a display; and
a computer connected to the display, connected to the input device to receive data and command input from the operator, and connected to the temperature sensor for periodically receiving a series of temperature values transmitted by the temperature sensor, the computer including
memory for storing certain of the temperature values received from the temperature sensor,
memory for storing one or more preselected threshold values including a programmable threshold temperatures, and
control logic for (a) comparing the received temperature values with one or more of the preselected threshold values including a programmable Threshold Temperature to determine whether the temperature values satisfy a predetermined criteria, (b) storing in memory a temperature profile composed of a set of the temperature values which satisfy the predetermined criteria, the set of temperature values representing temperatures taken along the surface of a glass sheet, the predetermined criteria including comparing each of the temperature values to the Threshold Temperature to insure that only those temperature values following the first received temperature value greater than the threshold temperature are stored, and (c) displaying the stored temperature profile.

2. The automatic temperature monitoring and control system of claim 1 wherein the preselected threshold values include a programmable First Time Delay and including control logic for delaying the comparing and storing of temperature values for a period of time equal to the First Time Delay until a first temperature value above the Threshold Temperature is detected.

3. The automatic temperature monitoring and control system of claim 1 wherein the preselected threshold values include a Second Time Delay and including control logic for delaying the comparing and storing of temperature values for a period of time equal to the Second Time Delay between receipt of each of the series of temperature values after the first temperature value transmitted by the temperature sensor greater than the Threshold Temperature is received.

4. The automatic temperature monitoring and control system of claim 3 wherein the preselected threshold values include a programmable Set Size Value equal to a desired number of temperature values in a set.

5. The automatic temperature monitoring and control system of claim 4 wherein the values of Set Size Value and Second Time Delay are varied as a function of the length of one of the glass sheets being processed.

6. The automatic temperature monitoring and control system of claim 4 wherein the values of Set Size Value and Second Time Delay are varied as a function of the length of an entire load of glass sheets being processed.

7. The automatic temperature monitoring and control system of claim 1 including control logic for computing one or more statistical values for all of the temperature values satisfying the predetermined criteria from a set of temperature values of a preselected size, and displaying one or more of those statistical values.

8. The automatic temperature monitoring and control system of claim 7 wherein one of the statistical values computed by the control logic is the average of all the temperature values from a set of preselected size.

9. The automatic temperature monitoring and control system of claim 7 wherein one of the statistical values computed by the control logic is the maximum of all of the temperature values from a set of preselected size.

10. The automatic temperature monitoring and control system of claim 7 wherein one of the statistical values computed by the control logic is the minimum of all of the temperature values from a set of preselected size.

11. The automatic temperature monitoring and control system of claim 7 wherein one of the statistical values computed by the control logic is the standard deviation of all of the temperature values from a set of temperature values in a preselected size.

12. The automatic temperature monitoring and control system of claim 1 including an analog-to-digital converter having an input connected to the temperature sensor and an output connected to the computer, for converting the analog signals emitted by the temperature sensor to digital signals for storage in the computer's memory.

13. In a glass processing system including a furnace having radiant heating means, a conveyor for transporting glass sheets along a longitudinal path within the furnace and a variable power source for supplying power to the radiant heating means, an automatic temperature monitoring system comprising:
a pyrometer mounted in the system at a preselected location within the glass processing system for determining the temperature on the surface of glass sheets moving along the conveyor past the preselected location;
a data input device;
a display;
an analog-to-digital converter connected to the output of the pyrometer for converting the signals emitted from the pyrometer to digital temperature values; and
a computer connected to the data input device, connected to the display and connected to the analog-to-digital converter for periodically receiving a series of temperature values corresponding to the temperature of the surface of the glass sheets at a series of points along the direction of conveyance of the glass sheets, the computer including,
memory for storing the temperature values received,
memory for storing one or more programmable threshold values including a Threshold Temperature, a Set Size Value, and a Second Time Delay, and
control logic for (a) comparing each of the temperature values to the Threshold Temperature to determine the first temperature value above the Threshold Temperature, (b) thereafter comparing and storing the next and each subsequent temperature value transmitted by the temperature sensor, (c) delaying the comparing and storing of temperature values for a period of time equal to the Second Time Delay between receipt of each of the series of temperature values after the first temperature value greater than the Threshold Temperature is received, and until a set of temperature values equal to the Set Size Value is stored, (d) computing a statistical value as a function of this stored set of temperature values, and (e) displaying the statistical value computed from this stored set along with a preselected number of like statistical values computed from previously stored sets.

14. The automatic temperature monitoring and control system of claim 13 wherein the computer includes control logic for displaying a set of stored temperature values.

15. The automatic temperature monitoring and control system of claim 13 wherein the statistical value computed and displayed from each of the sets is the average of all temperature values in the set.

16. The automatic temperature monitoring and control system of claim 15 including memory for storing the average temperatures computed for the last five stored sets of temperature values and control logic for displaying the average of all the temperature values satisfying the predetermined criteria for the last stored set along with the stored average temperatures for the previous five stored sets.

17. The automatic temperature monitoring and control system of claim 13 wherein the computer includes an output connected to the variable power source and control logic transmitting a signal to the output to the power source to vary the power supplied to the radiant heating means as a function of the stored temperature values and one or more of the programmable threshold values.

18. In a glass processing system including a furnace having radiant heating means, a conveyor for transporting glass sheets along a longitudinal path within the furnace and a variable power source for supplying power to the radiant heating means within the furnace, an automatic temperature monitoring system including:
a pyrometer mounted at a preselected location within the glass processing system for determining the temperature on the surface of glass sheets moving along the conveyor past the preselected location;
a data input device;
a display;
an analog-to-digital converter connected to the pyrometer for converting the signals emitted from the pyrometer to digital temperature values;
a computer connected to the data input device, connected to the display and connected to the analog-to-digital converter for receiving a series of temperature values transmitted by the pyrometer corresponding to the temperature of the surface of the glass sheets taken at a series of points along the direction of conveyance of those sheets,
an output connected to the power source to the furnace for varying the power to the radiant heating means,
memory for storing the temperature values received,
memory for storing one or more programmable threshold values including a Threshold Temperature, a Set Size Value, a First Time Delay, and a Second Time Delay, and
control logic for (a) comparing each of the temperature values to the Threshold Temperature to determine the first temperature value above the Threshold Temperature, (b) thereafter reading and storing the next and each subsequent temperature value transmitted by the temperature sensor, (c) delaying the reading and storing of (b) for a period of time equal to the Second Time Delay between readings after reading and storing the first temperature value greater than the Threshold Temperature until a set of temperature values equal to the Set Size Value is stored, (d) computing a statistical value as a function of the stored set of temperature values, (e) comparing the statistical value with one or more of the programmable threshold values, and (f) transmitting a signal to the output to the power source to effect a variation in the power supplied to the radiant heating means as a function of the comparing of (e) of the statistical value with the programmable threshold values.

19. The automatic temperature monitoring system of claim 18 including control logic for delaying the reading and storing of (b) for a period of time equal to the First Time Delay until the First Temperature Value above the Threshold Temperature is detected.

* * * * *

UNITED STATES PATENT AND TRADEMARK OFFICE
CERTIFICATE OF CORRECTION

PATENT NO. : 4,807,144
DATED : February 21, 1989
INVENTOR(S) : Stanley W. Joehlin, et. al.

It is certified that error appears in the above-identified patent and that said Letters Patent is hereby corrected as shown below:

On the Title page, in the Abstract, col. 2, line 4, "temperture" should be --temperature--.
Col. 2, line 4, "a" should be --an--.
Col. 2, line 47, "analyses" should be --analyzes--.
Col. 3, line 60, after "best" insert --mode--.
Col. 4, line 7, after "is" insert --a--.
Col. 7, line 29, "or" should be --of--.
Col. 8, lines 42-43, after "Subtotal" (second occurrence) insert --1--.
Col. 8, line 57, delete "the" (first occurrence).
Col. 8, line 59, "glass" should be --glass--.
Col. 9, line 16, "represent" should be --represents--.
Col. 9, line 48, after "more" insert --of--.
Col. 11, line 2, "alternative" should be --alternatives--.
Col. 11, line 27, "threshold temperatures" should be --Threshold Temperature--.
Col. 11, line 42-43, "threshold temperature" should be --Threshold --Temperature--.
Col. 14, line 48, "First Temperature Value" should be --first temperature value--.

Signed and Sealed this

Twenty-fifth Day of May, 1993

Attest:

MICHAEL K. KIRK

Attesting Officer

Acting Commissioner of Patents and Trademarks